United States Patent
Kim et al.

(10) Patent No.: US 9,742,628 B2
(45) Date of Patent: Aug. 22, 2017

(54) CROSS-LAYER AWARE COMMUNICATION OF A MULTIPATH DATA FLOW VIA A COMMUNICATION NETWORK

(71) Applicants: Young-Jin Kim, Basking Ridge, NJ (US); John E. Simsarian, Highland Park, NJ (US); Marina Thottan, Westfield, NJ (US)

(72) Inventors: Young-Jin Kim, Basking Ridge, NJ (US); John E. Simsarian, Highland Park, NJ (US); Marina Thottan, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 165 days.

(21) Appl. No.: 14/664,311

(22) Filed: Mar. 20, 2015

(65) Prior Publication Data

US 2016/0277247 A1   Sep. 22, 2016

(51) Int. Cl.
| | |
|---|---|
| *H04L 12/26* | (2006.01) |
| *H04L 12/24* | (2006.01) |
| *H04L 12/707* | (2013.01) |

(52) U.S. Cl.
CPC .......... *H04L 41/0826* (2013.01); *H04L 45/24* (2013.01); *H04L 41/0836* (2013.01); *H04L 43/0823* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 2015/0023348 A1* | 1/2015 | Hui .................. | H04L 49/20 370/392 |
| 2016/0119196 A1* | 4/2016 | Comeras ............. | H04L 41/5054 709/226 |

OTHER PUBLICATIONS

Kim et al., "Cross-Layer Orchestration for Elastic and Resilient Packet Service in a Reconfigurable Optical Transport Network," 2015 Optical Fiber Communications Conference and Exhibition (OFC), IEEE Conference Publication, Paper Tu2B.2, 2015, pp. 1-3.

* cited by examiner

*Primary Examiner* — Chi H Pham
*Assistant Examiner* — Fahmida Chowdhury
(74) *Attorney, Agent, or Firm* — Tong, Rea, Bentley & Kim, LLC (57) ABSTRACT

A capability for cross-layer aware communication of a multipath data flow via a communication network is presented. The multipath data flow is transported using a set of multiple transmission flows based on a multipath transport protocol. The communication network supports a set of multiple communication paths. A controller is configured to determine a set of mappings between the multiple transmission flows of the multipath data flow and the multiple communication paths based on cross-layer state information, compute a set of path mapping rules for a network element based on the mappings between the multiple transmission flows of the multipath data flow and the multiple communication paths, and provide the path mapping rules to the network element. The network element is configured to apply the path mapping rules for mapping packets of the multipath data flow between the multiple transmission flows of the multipath data flow and the multiple communication paths.

18 Claims, 4 Drawing Sheets

CROSS-LAYER AWARE COMMUNICATION OF A MULTIPATH DATA FLOW VIA A COMMUNICATION NETWORK

TECHNICAL FIELD

The disclosure relates generally to communication networks and, more specifically but not exclusively, to cross-layer aware communication of a multipath data flow via a communication network.

BACKGROUND

The use of datacenters continues to increase. Many large-scale datacenter operators manage multiple datacenters and are exchanging increasingly high volumes of data among their datacenters (e.g., for purposes such as load-balancing, distributed query processing, data back-up, and so forth). The multiple datacenters typically are connected via communication networks, such as core networks, metro networks, long-haul links, and so forth. In general, communication links between the datacenters are typically over-provisioned in order to ensure high service availability for services using the datacenters. Disadvantageously, however, such over-provisioning of the communication links between the datacenters may cause the datacenter operator to incur relatively high capital costs.

SUMMARY OF EMBODIMENTS

Various deficiencies in the prior art are addressed by embodiments for cross-layer aware communication of a multipath data flow, which is based on a multipath transport protocol, via a communication network.

In at least some embodiments, an apparatus includes a processor and a memory communicatively connected to the processor, wherein the processor is configured to receive first state information associated with transport of a multipath data flow via a set of multiple transmission flows based on a multipath transport protocol, receive second state information associated with a communication network configured to support a set of multiple communication paths, and determine, based on the first state information and the second state information, a set of mappings between the multiple transmission flows of the multipath data flow and the multiple communication paths of the communication network.

In at least some embodiments, a method includes using a processor and a memory for receiving first state information associated with transport of a multipath data flow via a set of multiple transmission flows based on a multipath transport protocol, receiving second state information associated with a communication network configured to support a set of multiple communication paths, and determining, based on the first state information and the second state information, a set of mappings between the multiple transmission flows of the multipath data flow and the multiple communication paths of the communication network.

In at least some embodiments, an apparatus includes a processor and a memory communicatively connected to the processor. The processor is configured to receive, from a controller, a set of path mapping rules for a multipath data flow to be transported via a set of multiple transmission flows based on a multipath transport protocol, wherein the path mapping rules are based on first state information associated with transport of the multipath data flow via the set of multiple transmission flows of the multipath data flow and second state information associated with a communication network configured to support a set of multiple communication paths. The processor is configured to determine, based on the set of path mapping rules, mapping of packets of the data flow between the multiple transmission flows and the multiple communication paths of the communication network.

In at least some embodiments, a method includes using a processor and a memory to perform a set of steps. The method includes receiving, from a controller, a set of path mapping rules for a multipath data flow to be transported via a set of multiple transmission flows based on a multipath transport protocol, wherein the path mapping rules are based on first state information associated with transport of the multipath data flow via the set of multiple transmission flows of the multipath data flow and second state information associated with a communication network configured to support a set of multiple communication paths. The method includes determining, based on the set of path mapping rules, mapping of packets of the data flow between the multiple transmission flows and the multiple communication paths of the communication network.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements that are common to the figures.

DETAILED DESCRIPTION OF EMBODIMENTS

A capability for cross-layer aware communication of a multipath data flow via a communication network is presented. Various embodiments of the capability for cross-layer aware communication of a multipath data flow via a communication network may support communication of a set of multiple transmission flows of the multipath data flow using a set of multiple communication paths of the communication network based on cross-layer state information. Various embodiments of the capability for cross-layer aware communication of a multipath data flow via a communication network may utilize a controller configured to determine a set of mappings between the multiple transmission flows of the multipath data flow and the multiple communication paths based on cross-layer state information, compute a set of path mapping rules for a network element based on the mappings between the multiple transmission flows of the multipath data flow and the multiple communication paths, and provide the path mapping rules to the network element. Various embodiments of the capability for cross-layer aware communication of a multipath data flow via a communication network may utilize a network element configured to receive path mapping rules from a controller and apply the path mapping rules for mapping packets of the multipath data flow between the multiple transmission flows of the multipath data flow and the multiple communication paths. Various embodiments of the capability for cross-layer aware communication of a multipath data flow via a communication network may utilize cross-layer state information that includes first state information associated with transport of the multipath data flow via the multiple transmission flows (e.g., layer 4 state information associated with an endpoint of the multipath data flow, layer 3 state information associated an endpoint of the multipath data flow, or the like) and second state information associated with the communication network (e.g., one or more of layer 3, layer 2.5, layer 2, or layer 1 state information of the communication network). Various embodiments of the capability for cross-layer aware communication of a multipath data flow via a communication network enable multipath forwarding for the multipath data flow to be performed deterministically. Various embodiments of the capability for cross-layer aware communication of a multipath data flow via a communication network may enable communication of the multipath data flow via the communication network to be adjusted dynamically according to availability of communication paths of the communication network (e.g., based on congestion, impairments conditions, failure conditions, or the like, as well as various combinations thereof). These and various other embodiments and potential advantages of the capability for cross-layer aware communication of a multipath data flow may be further understood by way of reference to the exemplary communication system of FIG. 1.

Figure 1:
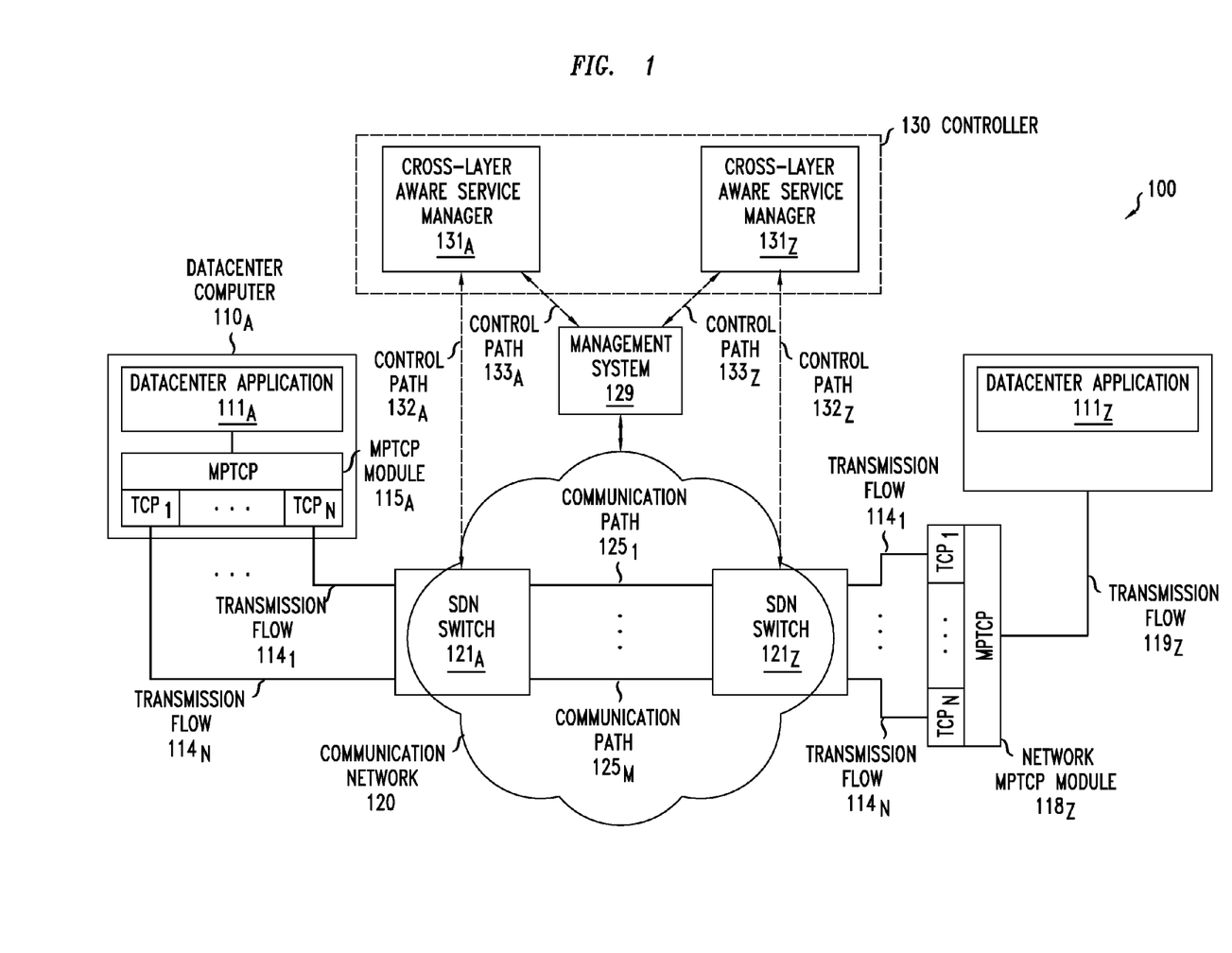
FIG. 1 depicts an exemplary communication system including cross-layer-aware service managers configured to support cross-layer aware communication of a multipath data flow via multiple communication paths of a communication network.

FIG. 1 depicts an exemplary communication system including cross-layer-aware service managers configured to support cross-layer aware communication of a multipath data flow via multiple communication paths of a communication network.

The exemplary communication system 100 includes a pair of datacenter (DC) computers (DCCs) $110_A$ and $110_Z$ (collectively, DCCs 110), a communication network (CN) 120, and a controller 130. The CN 120 includes a pair of software-defined network (SDN) switches $121_A$ and $121_Z$ (collectively SDN switches 121).

The DCCs 110 are configured to operate as the endpoints of a data flow to be exchanged between the DCs 110. The DCC $110_A$ is associated with a first DC and the DCC $110_Z$ is associated with a second DC. The first and second DCs are expected to be geographically remote such that communication of data between the DCCs 110 is required to traverse a communication network (as opposed to communications within a DC). The DCs in which the DCCs 110 are hosted may belong to the same cloud provider or different cloud providers. The DCCs 110 support a datacenter application (DCA) 111, where an instance of DCA 111 (illustratively, DCA $111_A$) is running on DCC $110_A$ and an instance of DCA 111 (illustratively, DCA $111_Z$) is running on DCC $110_Z$. The instances of DCA 111 are configured to exchange data with each other via a data flow. It will be appreciated that various types of data may be exchanged between the instances of DCA 111 by DCCs 110 (which may depend on the type of application supported as well as various other factors).

The DCCs 110, as discussed above, exchange packets of a data flow between DCA $111_A$ running on DCC $110_A$ and DCA $111_Z$ running on DCC $110_Z$. The packets of the data flow, for a portion of the end-to-end path between DCA $111_A$ running on DCC $110_A$ and DCA $111_Z$ running on DCC $110_Z$, are transported as a multipath data flow using a set of multipath transmission flows (TFs) $114_1$-$114_N$ (collectively, TFs 114) supported by a multipath transport protocol. In the exemplary embodiment of FIG. 1, the multipath transport protocol is a multipath version of the Transmission Control Protocol (TCP) that is referred to as Multipath TCP (MPTCP)) and, thus, the set of TFs 114 includes N TCP flows. In the exemplary embodiment of FIG. 1, as noted above, MPTCP is not supported end-to-end between DCC $110_A$ and DCC $110_Z$ (illustratively, DCC $110_A$ is configured to support MPTCP, while DCC $110_Z$ is not configured to support MPTCP); rather, MPTCP is supported between DCC $110_A$ and a network device associated with SDN switch $121_Z$ and, thus, DCC $110_A$ includes an MPTCP module $115_A$ and SDN switch $121_Z$ has associated therewith a network MPTCP module $118_Z$. The MPTCP module $115_A$ of the DCC $110_A$ is configured to map packets of the data flow of DCA $111_A$ into the set of TFs 114 of the multipath data flow (illustratively, into the N TCP flows) for transport to SDN switch $121_A$ (which operates as an ingress point into CN 120 for the multipath data flow) and, thus, transport over CN 120. The TFs 114 may follow one or more paths from the MPTCP module $115_A$ of the DCC $110_A$ to SDN switch $121_A$. The network MPTCP module $118_Z$ associated with the SDN switch $121_Z$ is configured to receive packets of the multipath data flow from SDN switch 121 $_Z$ via the set of TFs 114 of the multipath data flow and, since DCC $110_Z$ is not configured to support MPTCP, to recombine the packets of the multipath data flow from the set of TFs 114 of the multipath data flow (illustratively, from the N TCP flows) into a single transmission flow $119_Z$ of a single path transport protocol (e.g., conventional TCP) for transport to DCC $110_Z$ and delivery to DCA $111_Z$ running on DCC $110_Z$. It will be appreciated that, although depicted and described with respect to an embodiment in which network MPTCP module $118_Z$ is separate from SDN switch $121_Z$, in at least some embodiments the network MPTCP module $118_Z$ may be implemented as part of SDN switch $121_Z$. It will be appreciated that, although primarily presented herein with respect to embodiments in which network-based MPTCP mapping support is provided by a specific device (by SDN switch $121_A$ and/or by SDN switch $121_Z$ as discussed above for other embodiments), network-based MPTCP mapping support may be provided at any suitable location between the DCC 110 and its associated SDN switch 121 (e.g., at any other suitable device located between DCC $110_A$ and SDN switch $121_A$ and/or at any other suitable device located between DCC $110_Z$ and SDN switch $121_Z$). It will be appreciated that, although depicted and described with respect to an embodiment in which MPTCP is supported by the source endpoint on one side and not supported by the destination endpoint on the other side, this is merely meant to illustrate that there are various options for deploying MPTCP modules (e.g., in at least some embodiments MPTCP is not supported by the source endpoint and is supported by the destination endpoint such that network-based MPTCP mapping support is provided on the source side (e.g., by SDN switch $121_A$), in at least some embodiments both endpoints may support MPTCP such that network-based MPTCP mapping support is not needed, in at least some embodiments neither endpoint supports MPTCP such that network-based MPTCP mapping support is needed on both the source side (e.g., by SDN switch $121_A$) and the destination side (e.g., by SDN switch $121_Z$), or the like). It will be appreciated that, although primarily presented herein with respect to embodiments in which the multiple transport protocol is MPTCP, embodiments presented herein may be used with various other types of multipath transport protocols supporting multipath delivery of data at the transport layer (e.g., a multipath implementation of the User Datagram Protocol (UDP), a multipath implementation of the Stream Control Transmission Protocol (SCTP), a multipath implementation of the Resource Reservation Protocol (RSVP), or any other suitable multipath transport protocol supporting multipath delivery of data at the transport layer).

The CN 120 is a multipath communication network supporting a set of multiple communication paths (CPs) $125_1$-$125_M$ (collectively, CPs 125) between SDN switch $121_A$ associated with DCC $110_A$ and SDN switch $121_Z$ associated with DCC $110_Z$. It will be appreciated that the CPs 125 of CN 120 depicted in FIG. 1 may represent a subset of the full set of communication paths which may be supported within CN 120 (e.g., CPs 125 of CN 120 depicted in FIG. 1 may be those communication paths of CN 120 which are selected to support transport of the TFs 114 of the multipath data flow as discussed further herein). It will be appreciated that M in the set of CPs $125_1$-$125_M$ may or may not be equal to N in the set of TFs $114_1$-$114_N$ of the multipath data flow depending on whether or not mappings between the TFs 114 of the multipath data flow and the CPs 125 of CN 120 are performed on a 1:1 basis (or whether multiple TFs 114 are mapped to a single CP 125 or a single TF 114 is distributed across multiple CPs 125). The CN 120 may support communications at the physical layer (which also may be referred to as layer 1), the data link layer (which also may be referred to as layer 2), and the network layer (which also may be referred to as layer 3). For example, within the context of the Open Systems Interconnection (OSI) model, CN 120 may support communications at OSI Layer 1 (L1), OSI Layer 2 (L2), OSI Layer 2.5 (L2.5), and OSI Layer 3 (L3). The CN 120 may support communications using various technologies configured for communication at the various communication layers noted above. For example, CN 120 may support communications using various combinations of optical networks and optical networking technologies (e.g., Optical Transport Networks (OTNs), Wavelength Division Multiplexing (WDM), or the like), Ethernet, Multiprotocol Label Switching (MPLS), Internet Protocol (IP), or the like, as well as various combinations thereof. The CN 120 may support communications using various elements (e.g., nodes, communication links, or the like) configured to support communications at the various communication layers noted above. The nodes may include access/edge nodes, core nodes, control nodes, or the like, as well as various combinations thereof. For example, CN 120 may include routers (e.g., layer 3 routers, layer 3/2 routers, or the like), switches (e.g., layer 3 switches, layer 2 switches, or the like), hubs, repeaters, signaling nodes, control nodes, or the like, as well as various combinations thereof. For example, CPs 125 of CN 120 may be supported using an optical transport network where ingress IP/optical switches are configured to map packets of IP flows onto optical paths (e.g., SDN switch $121_A$ routes IP packets to an ingress IP/optical switch configured to route the IP packets onto optical paths) and egress optical/IP switches are configured to map packets of IP flows out of optical paths (e.g., SDN switch $121_Z$ receives IP packets from an egress optical/IP switch configured to map packets of IP flows out of optical paths). It will be appreciated that various other types of multipath communication networks and associated multipath communication network technologies may be used to support CPs 125 of CN 120. The CN 120 has associated therewith a management system (MS) 129 that is configured to perform various management functions for CN 120 (e.g., collecting state information from CN 120 as discussed further below, configuring elements of CN 120, or the like, as well as various combinations thereof).

The SDN switches 121 are configured to support path mapping functions for mapping between the multiple TFs 114 of the multipath data flow and the multiple CPs 125 of the CN 120. The SDN switch $121_A$ associated with DCC $110_A$ is configured to support mapping of the multiple TFs 114 transporting packets of the multipath data flow into CPs 125 of CN 120 for transport via CN 120 and, similarly, the SDN switch $121_Z$ associated with DCC $110_Z$ is configured to support mapping of the CPs 125 of CN 120 for the multipath data flow back into the multiple TFs 114 of the multipath data flow. The SDN switches 121 are configured to perform path mapping functions based on path mapping rules received by the SDN switches 121 from controller 130. The controller 130, as discussed further below, is configured to determine sets of mappings between the multiple TFs 114 of the multipath data flow and the multiple CPs 125 of the CN 120 based on cross-layer state information, compute sets of path mapping rules for the SDN switches 121 based on the sets of mappings between the multiple TFs 114 of the multipath data flow and the multiple CPs 125 of the CN 120, and send the sets of path mapping rules to the SDN switches 121 for use by the SDN switches 121 in performing the path mapping functions discussed above.

The controller 130 is configured to control mappings between the multiple TFs 114 of the multipath data flow and the multiple CPs 125 of the CN 120 by obtaining cross-layer state information, determining mappings between the multiple TFs 114 of the multipath data flow and the multiple CPs 125 of the CN 120 based on cross-layer state information, computing path mapping rules for the SDN switches 121 based on the mappings between the multiple TFs 114 of the multipath data flow and the multiple CPs 125 of the CN 120, and sending the path mapping rules to the SDN switches 121 for use by the SDN switches 121 to map packets of the multipath data flow between the multiple TFs 114 of the multipath data flow and the multiple CPs 125 of the CN 120. The controller 130 includes a pair of cross-layer aware service managers (CLSMs) 131 including a CLSM $131_A$ associated with the DC that is hosting DCC $110_A$ (associated with the source side of the end-to-end data flow) and a CLSM $131_Z$ associated with the DC that is hosting DCC $110_Z$ (associated with the destination side of the end-to-end data flow). The CLSMs $131_A$ and 131, are configured to operate as SDN controllers for SDN switches $121_A$ and $121_Z$, respectively. The SDN-based communication between the CLSMs $131_A$ and 131, and respective SDN switches $121_A$ and 121, may be supported using control paths $132_A$ and $132_Z$, respectively. The SDN-based communication between the CLSMs $131_A$ and $131_Z$ and respective SDN switches $121_A$ and $121_Z$ may be supported using any suitable SDN implementation/protocol (e.g., OpenFlow or any other suitable SDN implementation/protocol). The CLSM $131_A$ and CLSM $131_Z$ also are configured to communicate with MS 129 via control paths $133_A$ and $133_Z$, respectively (e.g., for purposes of obtaining state information associated with CN 120 or performing other suitable functions). It will be appreciated that, although depicted and described as being part of controller 130, CLSM $131_A$ and CLSM $131_Z$ may be separate devices deployed in different locations (e.g., CLSM $131_A$ may be deployed within or geographically proximate the DC hosting DCC $110_A$ and CLSM $131_Z$ may be deployed within or geographically proximate the DC hosting DCC $110_Z$).

The CLSM $131_A$ and CLSM $131_Z$ are configured to receive cross-layer state information and compute path mapping rules for SDN switches $121_A$ and $121_Z$, respectively, based on the cross-layer state information.

The cross-layer state information received by the CLSMs 131 includes endpoint-facing state information associated with the multiple TFs 114 of the multipath data flow (e.g., CLSM $131_A$ receives endpoint-facing state information associated with the multiple TFs 114 of the multipath data flow of SDN switch $110_A$ and CLSM $131_Z$ receives endpoint-facing state information associated with the multiple TFs 114 of the multipath data flow of SDN switch $110_Z$) and also includes network-facing state information associated with CN 120.

The endpoint-facing state information received by a CLSM 131 is information associated with transport of the multipath data flow between the DCC 110 and the SDN switch 121 that is associated with that CLSM 131. The endpoint-facing state information may include layer 4 (transport layer) state information associated with the multiple TFs 114 into which the end-to-end data flow is mapped (e.g., the number of TFs 114 used for multipath transport of the end-to-end data flow, characteristics of the multiple TFs 114 used for multipath transport of the end-to-end data flow, transport layer congestion information associated with the multiple TFs 114 used for multipath transport of the end-to-end data flow, indications of impairments which may impact the multiple TFs 114 used for multipath transport of the end-to-end data flow, indications of failures which may impact the multiple TFs 114 used for multipath transport of the end-to-end data flow, or the like, as well as various combinations thereof). The endpoint-facing state information may include layer 3 (network layer) state information associated with the network path(s) of the multipath data flow between the DCC 110 and the SDN switch 121 that is associated with that CLSM 131 (e.g., congestion information, impairment information, failure information, or the like, as well as various combinations thereof). The endpoint-facing state information may include layer 4 (transport layer) state information and layer 3 (network layer) state information. The endpoint-facing state information may include layer 4 (transport layer) state information and layer 3 (network layer) state information from the endpoint of the multipath data flow (illustratively, received by CLSM $131_A$ from DCC $110_A$ on the source side and received by CLSM $131_Z$ from SDN switch $121_Z$ on the destination side). The endpoint-facing state information may include DC state information associated with the transport of the multipath data flow within the DC (e.g., DC network state information, congestion information, failure information, or the like), network state information associated with transport of the multipath data flow between the DC and SDN switch 121 (e.g., communication network state information, congestion information, impairment information, failure information, or the like), or the like, as well as various combinations thereof. The endpoint-facing state information may include any other suitable state information associated with transport of the multipath data flow between the DCC 110 and the SDN switch 121 associated with that CLSM 131. The endpoint-facing state information may be received by the CLSM 131 from the SDN switch 121, from the DCC 110 (e.g., via the SDN switch 121 and/or via any other suitable in-band or out-of-band signaling path), from a management system (omitted for purposes of clarity) that is configured to manage elements supporting communication between the DCC 110 and the SDN switch 121 (e.g., top-of-rack switches in the DC, aggregating switches in the DC, controllers in the DC, switches or routers between the DC network and the SDN switch 121, or the like, as well as various combinations thereof), or the like, as well as various combinations thereof. It will be appreciated that the endpoint-facing state information may be referred to more generally as cross-layer state information or, more generally, state information.

The network-facing state information received by a CLSM 131 is information associated with transport of the multiple TFs 114 of the multipath data flow via CN 120. The network-facing state information may include one or more of layer 3 (network layer) state information associated with CN 120, layer 2.5 (e.g., MPLS or any other suitable protocol) state information associated with CN 120, layer 2 (data link layer) state information associated with CN 120, or layer 1 (physical layer) state information associated with CN 120. For example, the network-facing state information may include state information indicative of the number of CPs 125 in the set of multiple CPs 125 available for supporting communication of the multiple TFs 114 via CN 120, state information indicative of the congestion state of CN 120, state information indicative of impairments in CN 120, state information indicative of failures in CN 120, or the like, as well as various combinations thereof. The types of state information available at the various layers of CN 120 may depend on the types of technology used to implement the various layers of CN 120 and will be understood by one skilled in the art. The network-facing state information may be received by the CLSM 131 from one or more elements of CN 120 (e.g., SDN-enabled elements of CN 120, such as the SDN switch 121 associated with the CLSM 131), one or more management systems associated with CN 120 (illustratively, MS 129), one or more servers configured to expose state information of the CN 120 (e.g., a server configured to expose state information using ALTO or any other suitable state information exposure capability), or the like, as well as various combinations thereof. In at least some embodiments, for example, the CLSM 131 may receive layer 3 and/or layer 2 information from SDN-enabled edge switches (illustratively, from SDN switch $121_A$ for CLSM $131_A$ and from SDN switch $121_Z$ for CLSM $131_Z$) and may receive layer 1 path information from one or more management systems or servers (e.g., from MS 129 of FIG. 1, from one or more ALTO servers or other state exposing servers as discussed above, or the like, as well as various combinations thereof). It will be appreciated that the network-facing state information may be referred to more generally as cross-layer state information or, more generally, state information.

The CLSM $131_A$ and CLSM $131_Z$ each are configured to receive cross-layer state information, determine mappings between the multiple TFs 114 of the multipath data flow and the multiple CPs 125 of the CN 120 based on the cross-layer state information, compute path mapping rules for the SDN switches 121 based on the mappings between the multiple TFs 114 of the multipath data flow and the multiple CPs 125 of the CN 120, and send the path mapping rules to the SDN switches 121, respectively.

The CLSM $131_A$ is configured to provide path mapping rules for use by SDN switch $121_A$ in mapping the multiple TFs 114 of the multipath data flow onto multiple CPs 125 of the CN 120 (for transmission of traffic of the end-to-end data flow from DCC $110_A$ toward DC $110_Z$) and to provide path mapping rules for use by SDN switch $121_A$ in mapping multiple CPs 125 of the CN 120 onto the multiple TFs 114 of the multipath data flow (for transmission of traffic of the end-to-end data flow from DCC $110_Z$ toward DC $110_A$). The CLSM $131_A$ is configured to receive cross-layer state information associated with the source side of the multipath data flow. The cross-layer state information received by CLSM $131_A$ includes endpoint-facing state information associated with the multiple TFs 114 of the multipath data flow from DCC $110_A$ to SDN switch $110_A$ and also includes network-facing state information associated with CN 120. The various types of cross-layer state information which may be used to compute path mapping rules are discussed further above. The CLSM $131_A$ is configured to compute path mapping rules for SDN switch $121_A$ based on the cross-layer state information associated with the source side of the multipath data flow. For packets of the end-to-end data flow transmitted in the direction from DCC $110_A$ toward DCC $110_Z$, CLSM $131_A$ is configured to (1) determine a set of mappings between the multiple TFs 114 of the multipath data flow and the multiple CPs 125 of the CN 120 (for mapping of packets of the multipath data flow from multiple TFs 114 of the multipath data flow into multiple CPs 125 of the CN 120 for transmission from SDN switch $121_A$ toward SDN switch $121_Z$) based on the cross-layer state information and (2) compute a set of path mapping rules for SDN switch $121_A$ (for mapping the multiple TFs 114 transporting packets of the multipath data flow into CPs 125 of CN 120 for transport via CN 120 toward SDN switch $121_Z$) based on the set of mappings between the multiple TFs 114 of the multipath data flow and the multiple CPs 125 of the CN 120. For packets of the end-to-end data flow transmitted in the direction from DCC $110_Z$ toward DCC $110_A$, CLSM $131_A$ is configured to (1) determine a set of mappings between the multiple CPs 125 of the CN 120 and the multiple TFs 114 of the multipath data flow (for mapping of packets of the multipath data flow from multiple CPs 125 of the CN 120 to multiple TFs 114 of the multipath data flow for transmission from SDN switch $121_A$ toward DCC $110_A$) based on the cross-layer state information and (2) compute a set of path mapping rules for SDN switch $121_A$ (for mapping the multiple CPs 125 of CN 120 transporting packets of the multipath data flow into the multiple TFs 114 for transport toward DCC $110_A$) based on the set of mappings between the multiple CPs 125 of the CN 120 and the multiple TFs 114 of the multipath data flow. The CLSM $131_A$ also may be configured to compute path mapping rules for SDN switch $121_A$ based on one or more other factors. For example, CLSM $131_A$ may be configured to compute path mapping rules for SDN switch $121_A$ based on existing rules on SDN switch $121_A$ (e.g., ensuring that the path mapping rules and existing rules on SDN switch $121_A$ can co-exist on SDN switch $121_A$), limitations of flow (or rule) table size on SDN switch $121_A$, or the like, as well as various combinations thereof). The CLSM $131_A$ is configured to send the path mapping rules for SDN switch $121_A$ to SDN switch $121_A$ using the SDN control plane supported by CLSM $131_A$ and SDN switch $121_A$. The SDN switch $121_A$ receives the path mapping rules from CLSM $131_A$ and uses the path mapping rules for mapping packets between the multiple TFs 114 transporting packets of the multipath data flow and the multiple CPs 125 of CN 120.

The CLSM $131_Z$ is configured to provide path mapping rules for use by SDN switch $121_Z$ in mapping the multiple TFs 114 of the multipath data flow onto multiple CPs 125 of the CN 120 (for transmission of traffic of the end-to-end data flow from DCC $110_Z$ toward DC $110_A$) and to provide path mapping rules for use by SDN switch $121_Z$ in mapping multiple CPs 125 of the CN 120 onto the multiple TFs 114 of the multipath data flow (for transmission of traffic of the end-to-end data flow from DCC $110_A$ toward DC $110_Z$). The CLSM 131z is configured to receive cross-layer state information associated with the destination side of the multipath data flow. The cross-layer state information received by CLSM $131_Z$ includes endpoint-facing state information associated with the multiple TFs 114 of the multipath data flow of SDN switch $110_Z$ and also includes network-facing state information associated with CN 120. The various types of cross-layer state information which may be used to compute path mapping rules are discussed further above. The CLSM $131_Z$ is configured to compute path mapping rules for SDN switch $121_Z$ based on the cross-layer state information associated with the destination side of the multipath data flow. For packets of the end-to-end data flow transmitted in the direction from DCC $110_Z$ toward DCC $110_A$, CLSM $131_Z$ is configured to (1) determine a set of mappings between the multiple TFs 114 of the multipath data flow and the multiple CPs 125 of the CN 120 (for mapping of packets of the multipath data flow from multiple TFs 114 of the multipath data flow into multiple CPs 125 of the CN 120 for transmission from SDN switch $121_Z$ toward SDN switch $121_A$) based on the cross-layer state information and (2) compute a set of path mapping rules for SDN switch $121_Z$ (for mapping the multiple TFs 114 transporting packets of the multipath data flow into CPs 125 of CN 120 for transport via CN 120 toward SDN switch $121_A$) based on the set of mappings between the multiple TFs 114 of the multipath data flow and the multiple CPs 125 of the CN 120. For packets of the end-to-end data flow transmitted in the direction from DCC $110_A$ toward DCC $110_Z$, CLSM $131_Z$ is configured to (1) determine a set of mappings between the multiple CPs 125 of the CN 120 and the multiple TFs 114 of the multipath data flow (for mapping of data of the multipath data flow from multiple CPs 125 of the CN 120 to multiple TFs 114 of the multipath data flow for transmission from SDN switch $121_Z$ toward DCC $110_Z$) based on the cross-layer state information and (2) compute a set of path mapping rules for SDN switch $121_Z$ (for mapping the multiple CPs 125 of CN 120 transporting packets of the multipath data flow into the multiple TFs 114 for transport toward DCC $110_Z$) based on the set of mappings between the multiple CPs 125 of the CN 120 and the multiple TFs 114 of the multipath data flow. The CLSM $131_Z$ also may be configured to compute path mapping rules for SDN switch $121_Z$ based on one or more other factors. For example, CLSM $131_Z$ may be configured to compute path mapping rules for SDN switch $121_Z$ based on existing rules on SDN switch 121z (e.g., ensuring that the path mapping rules and existing rules on SDN switch $121_Z$ can co-exist on SDN switch $121_Z$), limitations of flow (or rule) table size on SDN switch $121_Z$, or the like, as well as various combinations thereof). The CLSM 131 $_Z$ is configured to send the path mapping rules for SDN switch $121_Z$ to SDN switch $121_Z$ using the SDN control plane supported by CLSM $131_Z$ and SDN switch $121_Z$. The SDN switch $121_Z$ receives the path mapping rules from CLSM $131_Z$ and uses the path mapping rules for mapping packets between the multiple TFs 114 transporting packets of the multipath data flow and the multiple CPs 125 of CN 120.

The CLSMs 131, as discussed above, determine mappings between the multiple TFs 114 transporting packets of the multipath data flow and the multiple CPs 125 of CN 120 and, similarly, compute the associated path mapping rules for SDN switches 121 based on the mappings between the multiple TFs 114 transporting packets of the multipath data flow and the multiple CPs 125 of CN 120. The mappings between the multiple TFs 114 transporting packets of the multipath data flow and the multiple CPs 125 of CN 120 and the associated path mapping rules computed for the SDN switches 121 may be further understood by way of specific examples of mappings and associated path mapping rules for specific types of technologies which may be used to implement CN 120. For example, where CN 120 is an optical transport network including a set of optical paths, the mappings between the multiple TFs 114 transporting packets of the multipath data flow and the multiple CPs 125 of CN 120 may be mappings between the multiple TFs 114 transporting packets of the multipath data flow (e.g., TCP flows where MPTCP is used) and the optical paths (e.g., optical channels, particular wavelengths on one or more optical channels, or the like, as well as various combinations thereof). For example, where CN 120 is an MPLS-based network including a set of MPLS paths, the mappings between the multiple TFs 114 transporting packets of the multipath data flow and the multiple CPs 125 of CN 120 may be mappings between the multiple TFs 114 transporting packets of the multipath data flow (e.g., TCP flows where MPTCP is used) and the MPLS paths (e.g., mappings between the TFs 114 and specific MPLS labels, mappings between the TFs 114 and specific MPLS tags, or the like, as well as various combinations thereof). It will be appreciated that mappings and associated path mapping rules may be expressed in various ways depending on various factors (e.g., the type of multipath transport protocol used, the type of technology used to provide the CPs 125 of CN 120, or the like, as well as various combinations thereof).

The CLSMs 131 may compute path mapping rules for SDN switches 121 and provide the path mapping rules to the SDN switches 121 in response to various trigger conditions. In at least some embodiments, CLSMs 131 may compute path mapping rules and provide the path mapping rules to the SDN switches 121 in advance of establishment of the multipath data flow between DCC $110_A$ and DCC $110_Z$ or in advance of transmission of packets via the multipath data flow between DCC $110_A$ and DCC $110_Z$. In at least some embodiments, CLSMs 131 may compute path mapping rules and provide the path mapping rules to the SDN switches 121 responsive to receipt of packets via the constituent data flows of the multipath data flow (e.g., via the TCP flows of the MPTCP data flow). For example, as SDN switch $121_A$ receives the first packet of each of the TCP flows of the MPTCP flow and determines that it does not have a rule for handling packets of the respective TCP flow of the MPTCP flow, SDN switch $121_A$ may forward the packet (or some other suitable version of a request for rules) to CLSM $131_A$ to trigger CLSM $131_A$ to compute a path mapping rule(s) for that TCP flow of the MPTCP flow and to provide the path mapping rule(s) for that TCP flow of the MPTCP flow to SDN switch $121_A$ for use in forwarding subsequent packets of that TCP flow of the MPTCP flow. Similarly, for example, as SDN switch $121_Z$ receives the first packet of each of the TCP flows of the MPTCP flow and determines that it does not have a rule for handling packets of the respective TCP flow of the MPTCP flow, SDN switch $121_Z$ may forward the packet (or some other suitable version of a request for rules) to CLSM $131_Z$ to trigger CLSM $131_Z$ to compute a path mapping rule(s) for that TCP flow of the MPTCP flow and to provide the path mapping rule(s) for that TCP flow of the MPTCP flow to SDN switch $121_Z$ for use in forwarding subsequent packets of that TCP flow of the MPTCP flow.

It will be appreciated that, although primarily presented herein with respect to embodiments in which CLSMs $131_A$ and $131_Z$ are configured to provide the SDN control functions for respective SDN switches $121_A$ and $121_Z$, in at least some embodiments the SDN control functions depicted and described as being provided by CLSMs 131 may be provided by controller 130 in other ways (e.g., using a pair of separate SDN control modules which provide SDN control functions for respective SDN switches $121_A$ and $121_Z$, using a single SDN control module that provides SDN control functions for both SDN switches $121_A$ and $121_Z$, or the like, as well as various combinations thereof). In at least some such embodiments, CLSMs $131_A$ and $131_Z$ may determine mappings between the multiple TFs 114 of the multipath data flow onto and the multiple CPs 125 of the CN 120 and provide the mappings to the separate SDN control module(s) which may then compute the path mapping rules for SDN switches $121_A$ and $121_Z$ and provide the path mapping rules to SDN switches $121_A$ and $121_Z$. It will be appreciated that the SDN functions of controller 130 may be combined or distributed in various other ways.

It will be appreciated that, although primarily presented with respect to embodiments in which CLSMs $131_A$ and $131_Z$ are configured to provide the control functions for respective source and destination sides of the multipath data flow, in at least some embodiments a single CLSM may be configured to provide the control functions for both the source and destination sides of the multipath data flow. It will be appreciated that use of a pair of CLSMs to provide the control functions for respective source and destination sides of the multipath data flow (illustratively, CLSMs $131_A$ and $131_Z$ of controller 130) or use of a single CLSM to provide the control functions for both the source and destination sides of the multipath data flow may depend on various factors, such as whether the source and destination sides of the multipath data flow are controlled by the same entity (e.g., where the source and destination sides of the multipath data flow are controlled by the same entity (e.g., same cloud provider) then one or two CLSMs may be used, but where the source and destination sides of the multipath data flow are controlled by two different entities then two CLSMs operated by the two different entities will be used). It will be appreciated that various functions of controller 130 may be combined or distributed in various other ways.

It will be appreciated that, although primarily presented with respect to embodiments in which the multipath data flow is fully bidirectional (namely, using MPTCP in which each of the TCP flows is a bidirectional flow), various embodiments presented herein may be used to support a multipath data flow that is partially bidirectional and partially unidirectional (e.g., at least one of transmission flows of the multipath data flow is a bidirectional transmission flow and at least one of the transmission flows of the multipath data flow is a unidirectional transmission flow), various embodiments presented herein may be used to support a multipath data flow that is fully unidirectional (e.g., each of the transmission flows of the multipath data flow is a unidirectional transmission flow), or the like.

It will be appreciated that, although primarily presented herein with respect to embodiments in which the endpoints of the multipath data flow are datacenter computers of respective datacenters, various embodiments presented herein may be used to support multipath data flows between other types of endpoints (e.g., enterprise computers of respective enterprise locations of an enterprise or two different enterprises that communicate via a communication network, an end user computer and a network computer hosted in different locations and communicating via a communication network, or the like).

It will be appreciated that, although primarily presented herein with respect to embodiments in which path mapping rules are computed for a multipath data flow prior to establishment of the multipath data flow or at or near the time of establishment of the multipath data flow (e.g., as the first packet of each of the transmission flows is received at the CLSM), various embodiments presented herein may be used to support computation of path mapping rules for a multipath data flow at any time during the existence of the multipath data flow. For example, the CLSM that computes the path mapping rules for a multipath data flow may continue to receive various types of state information during the existence of the multipath data flow and may determine, based on the state information, whether or not to recompute the path mapping rules for the multipath data flow. For example, the CLSM may determine, based on state information, whether or not to modify one or more of the mappings between the multiple transmission flows of the multipath data flow and the multiple communication paths of the communication network. For example, the CLSM may determine, based on state information (e.g., based on a determination as to whether or not to modify one or more of the mappings between the multiple transmission flows of the multipath data flow and the multiple communication paths of the communication network), whether or not to modify one or more of the path mapping rules for the multipath data flow. For example, the CLSM may modify one or more path mapping rules for the multipath data flow based on one or more of an indication of congestion in the communication network, an indication of an impairment or a failure in the communication network, state information indicative that redistribution of one or more of the transmission flows is necessary or desirable, or the like, as well as various combinations thereof. In this manner, the CLSM may be configured to dynamically control communication of the multipath data flow via the communication network in a deterministic manner and, thus, may provide various advantages (e.g., improving reliability of the multipath data flow, enabling more efficient use of the resources of the communication network, or the like, as well as various combinations thereof).

Figure 2:
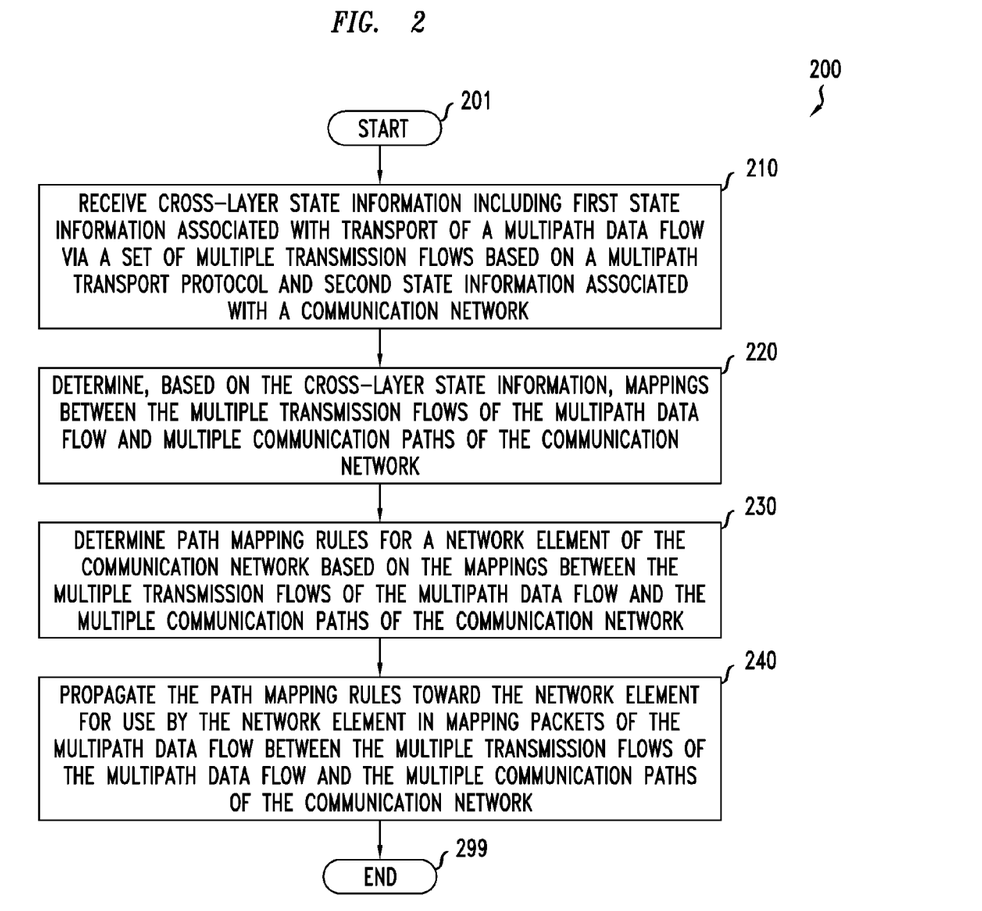
FIG. 2 depicts a method for use by a controller to determine a set of path mapping rules for a multipath data flow for use in mapping packets of the multipath data flow between multiple transmission flows of the multipath data flow and multiple communication paths of a communication network.

FIG. 2 depicts a method for use by a controller to determine a set of path mapping rules for a multipath data flow for use in mapping packets of the multipath data flow between multiple transmission flows of the multipath data flow and multiple communication paths of a communication network. It will be appreciated that, although primarily presented herein as being performed serially, at least a portion of the steps of method 200 may be performed contemporaneously or in a different order than as presented in FIG. 2. At step 201, method 200 begins. At step 210, cross-layer state information is received. The cross-layer state information is associated with transport of a data flow as a multipath data flow based on a multipath transport protocol. The cross-layer state information may include first state information associated with transport of the multipath data flow via a set of multiple transmission flows based on the multipath transport protocol (which also may be referred to herein as endpoint-facing state information) and second state information associated with the communication network (which also may be referred to herein as network-facing state information). At step 220, mappings between the multiple transmission flows of the multipath data flow and multiple communication paths of the communication network are determined based on the cross-layer state information. At step 230, path mapping rules for the multipath data flow are determined for a network element of the communication network based on the mappings between the multiple transmission flows of the multipath data flow and multiple communication paths of the communication network. At step 240, the path mapping rules for the multipath data flow are propagated toward the network element for use by the network element in mapping packets of the multipath data flow between the multiple transmission flows of the multipath data flow and the multiple communication paths of the communication network. At step 299, method 200 ends. It will be appreciated that the steps of method 200 of FIG. 2 may be further understood when considered in conjunction with the description of FIG. 1.

Figure 3:
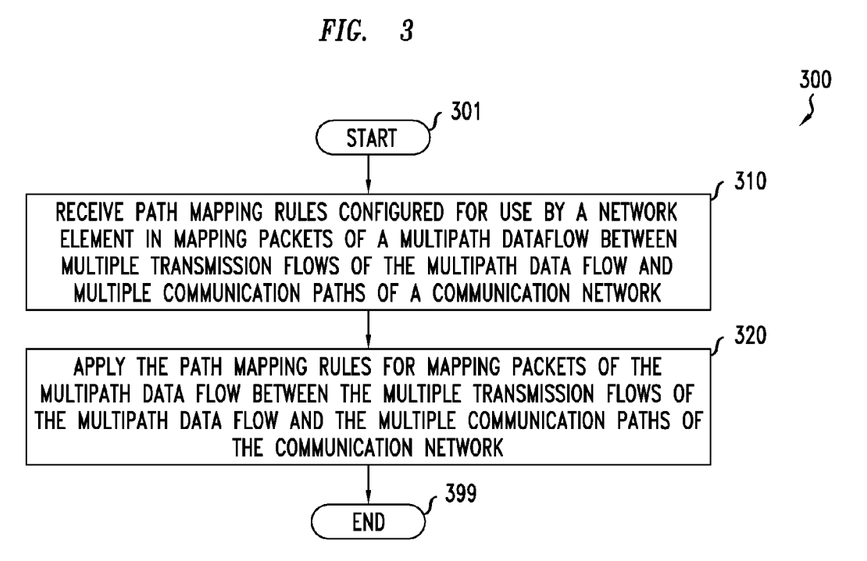
FIG. 3 depicts a method for use by a network element for using path mapping rules for a multipath data flow to map between multiple transmission flows of the multipath data flow and multiple communication paths of a communication network.

FIG. 3 depicts a method for use by a network element for using path mapping rules for a multipath data flow to map between multiple transmission flows of the multipath data flow and multiple communication paths of a communication network. It will be appreciated that, although primarily presented herein as being performed serially, at least a portion of the steps of method 300 may be performed contemporaneously or in a different order than as presented in FIG. 3. At step 301, method 300 begins. At step 310, the network element receives, from a controller, path mapping rules configured for use by the network element in mapping packets of the multipath data flow between the multiple transmission flows of the multipath data flow and the multiple communication paths of the communication network. At step 320, the network element applies the path mapping rules for mapping packets of the multipath data flow between the multiple transmission flows of the multipath data flow and the multiple communication paths of the communication network. At step 399, method 300 ends. It will be appreciated that the steps of method 300 of FIG. 3 may be further understood when considered in conjunction with the description of FIG. 1.

It will be appreciated that various embodiments of the capability for cross-layer aware communication of a multipath data flow may provide various advantages. Various embodiments of the capability for cross-layer aware communication of a multipath data flow may ensure service availability without requiring extensive over-provisioning or potentially computationally-intensive schemes (e.g., 1+1 or 1:N protection) often used in circuit-switched networks. It will be appreciated that various embodiments of the capability for cross-layer aware communication of a multipath data flow may provide other advantages.

Figure 4:
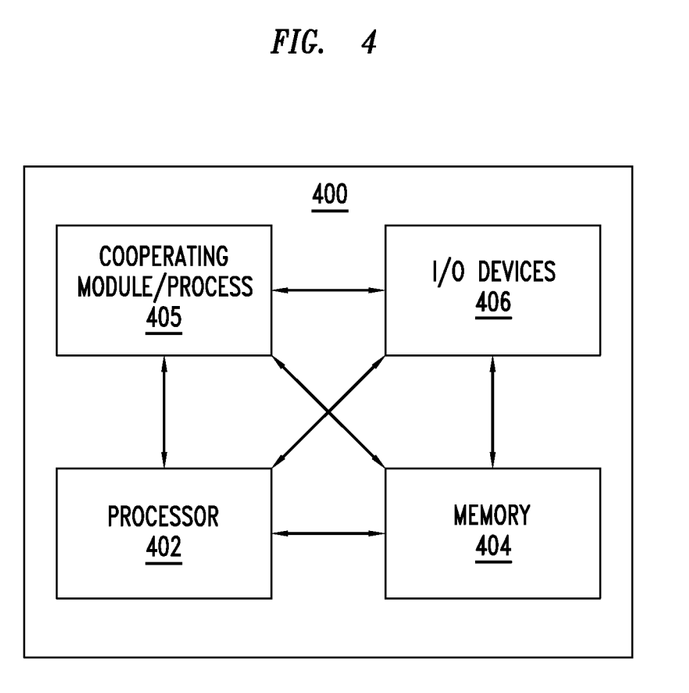
FIG. 4 depicts a high-level block diagram of a computer suitable for use in performing functions presented herein.

FIG. 4 depicts a high-level block diagram of a computer suitable for use in performing functions described herein.

The computer 400 includes a processor 402 (e.g., a central processing unit (CPU) or other suitable processor(s)) and a memory 404 (e.g., random access memory (RAM), read only memory (ROM), or the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of a DCC 110, a portion of a DCC 110, an SDN switch 121, a portion of an SDN switch 121, controller 130, a portion of controller 130, a CLSM 131, a portion of a CLSM 131, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive first state information associated with transport of a multipath data flow via a set of multiple transmission flows based on a multipath transport protocol;
receive second state information associated with a communication network configured to support a set of multiple communication paths;
determine, based on the first state information and the second state information, a set of mappings between the multiple transmission flows of the multipath data flow and the multiple communication paths of the communication network;
compute, based on the set of mappings between the multiple transmission flows of the multipath data flow and the multiple communication paths of the communication network, a set of path mapping rules configured for use by a network element of the communication network to map packets of the multipath data flow between the multiple transmission flows of the multipath data flow and the multiple communication paths of the communication network; and
propagate the path mapping rules toward the network element for use by the network element to map packets of the multipath data flow between the multiple transmission flows of the multipath data flow and the multiple communication paths of the communication network.

2. The apparatus of claim 1, wherein the first state information comprises transport layer state information.

3. The apparatus of claim 2, wherein the transport layer state information comprises a quantity of transmission flows in the set of multiple transmission flows.

4. The apparatus of claim 1, wherein the first state information comprises network layer state information.

5. The apparatus of claim 1, wherein the processor is configured to receive the first state information from at least one of an endpoint of the multipath data flow or a network element configured to convert between the multiple transmission flows of the multipath data flow and a transmission flow of a single path transport protocol.

6. The apparatus of claim 1, wherein the second state information comprises at least one of network layer state information, data link layer state information, or physical layer state information.

7. The apparatus of claim 1, wherein the second state information comprises a quantity of communication paths in the set of multiple communication paths.

8. The apparatus of claim 1, wherein the second state information comprises at least one of congestion information indicative of congestion within the communication network, impairment information indicative of an impairment within the communication network, or failure information indicative of a failure within the communication network.

9. The apparatus of claim 1, wherein the processor is configured to receive the second state information from at least one of a management system or a server configured to expose the second state information.

10. The apparatus of claim 1, wherein the processor is configured to determine the set of mappings between the multiple transmission flows and the multiple communication paths of the communication network responsive to an indication of a new flow request received from the network element.

11. The apparatus of claim 1, wherein the processor is configured to compute the set of path mapping rules based on an existing rule associated with the network element.

12. The apparatus of claim 1, wherein the processor is configured to compute the set of path mapping rules responsive to an indication of a new flow request received from the network element.

13. The apparatus of claim 1, wherein the set of path mapping rules comprises a rule configured for mapping packets of one of the multiple transmission flows to one of the multiple communication paths.

14. The apparatus of claim 1, wherein the apparatus comprises software-defined networking (SDN) control functions, wherein the network element comprises an SDN switch.

15. The apparatus of claim 1, wherein the multipath transport protocol comprises a Multipath Transmission Control Protocol (MPTCP), wherein the transmission flows comprise TCP flows.

16. The apparatus of claim 1, wherein the communication network comprises an optical transport network, wherein the multiple communication paths comprise network and optical paths of the optical transport network.

17. A method, comprising:

receiving, by a processor, first state information associated with transport of a multipath data flow via a set of multiple transmission flows based on a multipath transport protocol;

receiving, by the processor, second state information associated with a communication network configured to support a set of multiple communication paths;

determining, by the processor based on the first state information and the second state information, a set of mappings between the multiple transmission flows of the multipath data flow and the multiple communication paths of the communication network;

computing, by the processor based on the set of mappings between the multiple transmission flows of the multipath data flow and the multiple communication paths of the communication network, a set of path mapping rules configured for use by a network element of the communication network to map packets of the multipath data flow between the multiple transmission flows of the multipath data flow and the multiple communication paths of the communication network; and propagating, by the processor, the path mapping rules toward the network element for use by the network element to map packets of the multipath data flow between the multiple transmission flows of the multipath data flow and the multiple communication paths of the communication network.

18. A non-transitory computer-readable storage medium storing instructions which, when executed by a computer, cause the computer to perform a method, the method comprising:

receiving first state information associated with transport of a multipath data flow via a set of multiple transmission flows based on a multipath transport protocol;

receiving second state information associated with a communication network configured to support a set of multiple communication paths;

determining, based on the first state information and the second state information, a set of mappings between the multiple transmission flows of the multipath data flow and the multiple communication paths of the communication network;

computing, by the processor based on the set of mappings between the multiple transmission flows of the multipath data flow and the multiple communication paths of the communication network, a set of path mapping rules configured for use by a network element of the communication network to map packets of the multipath data flow between the multiple transmission flows of the multipath data flow and the multiple communication paths of the communication network; and propagating the path mapping rules toward the network element for use by the network element to map packets of the multipath data flow between the multiple transmission flows of the multipath data flow and the multiple communication paths of the communication network.

\* \* \* \* \*